United States Patent
Maeda et al.

(10) Patent No.: US 8,705,206 B1
(45) Date of Patent: Apr. 22, 2014

(54) MICROWAVE ASSISTED MAGNETIC RECORDING (MAMR) HEAD HAVING AN OFFSET SPIN TORQUE OSCILLATOR (STO) AND NARROW TRAILING GAP

(71) Applicant: HGST Netherlands B.V., Amsterdam (NL)

(72) Inventors: Maki Maeda, Hiratsuka (JP); Masato Shiimoto, Odawara (JP); Hiroyuki Katada, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/725,354

(22) Filed: Dec. 21, 2012

(51) Int. Cl.
 G11B 5/187 (2006.01)
 G11B 5/23 (2006.01)

(52) U.S. Cl.
 USPC ................................. 360/125.3; 360/119.04

(58) Field of Classification Search
 USPC ............... 360/119.01, 119.02, 119.04, 125.3
 See application file for complete search history.

(56) References Cited

U.S. PATENT DOCUMENTS

| | | | |
|---|---|---|---|
| 6,504,675 | B1 | 1/2003 | Shukh et al. |
| 6,967,810 | B2 | 11/2005 | Kasiraj et al. |
| 7,180,705 | B2 | 2/2007 | Matono et al. |
| 7,324,304 | B1 | 1/2008 | Benakli et al. |
| 7,372,656 | B2 | 5/2008 | Satoh et al. |
| 8,134,802 | B2 | 3/2012 | Bai et al. |
| 2007/0206323 | A1 | 9/2007 | Im et al. |
| 2011/0090603 | A1 | 4/2011 | Bai |
| 2011/0216447 | A1 | 9/2011 | Li et al. |
| 2011/0249359 | A1* | 10/2011 | Mochizuki et al. ............. 360/75 |
| 2012/0113543 | A1 | 5/2012 | Shiimoto et al. |
| 2012/0281314 | A1* | 11/2012 | Lopusnik et al. ........ 360/125.03 |
| 2013/0016443 | A1* | 1/2013 | de la Fuente et al. .... 360/123.12 |
| 2013/0028058 | A1* | 1/2013 | Yasui et al. ................ 369/13.14 |
| 2013/0057981 | A1* | 3/2013 | Urakami et al. ......... 360/125.03 |
| 2013/0148228 | A1* | 6/2013 | Albrecht et al. ................ 360/55 |

FOREIGN PATENT DOCUMENTS

| | | |
|---|---|---|
| JP | 2011060412 A | 3/2011 |
| JP | 2011/222112 A | 11/2011 |
| WO | 2011/132503 A1 | 10/2011 |

OTHER PUBLICATIONS

Yang et al., "Magnetic Field of an Asymmetric Ring Head with an Underlayer," 1993 IEEE, IEEE Transactions on Magnetics, vol. 29, No. 2, Mar. 1993, pp. 2069-2072.

Greaves et al., "Shingled Recording for 2-3 Tbit/in2," 2009 IEEE, IEEE Transactions on Magnetics, vol. 45, No. 10, Oct. 2009, pp. 3823-3829.

\* cited by examiner

*Primary Examiner* — Jefferson Evans
(74) *Attorney, Agent, or Firm* — Zilka-Kotab, PC

(57) ABSTRACT

A magnetic data storage system according to one embodiment includes a magnetic head adapted to record data according to a shingled magnetic recording (SMR) process. The magnetic head includes a main pole adapted to produce a writing magnetic field, a trailing shield positioned above a trailing side of the main pole, wherein a trailing gap is defined between the trailing shield and the main pole, and a spin torque oscillator (STO) positioned above a first trailing corner of the main pole at an STO-side of the main pole, wherein the trailing gap has a greater length in a film thickness direction near the STO-side of the main pole and a lesser length in the film thickness direction near a second trailing corner of the main pole opposite the first trailing corner in a track width direction of the main pole.

20 Claims, 12 Drawing Sheets

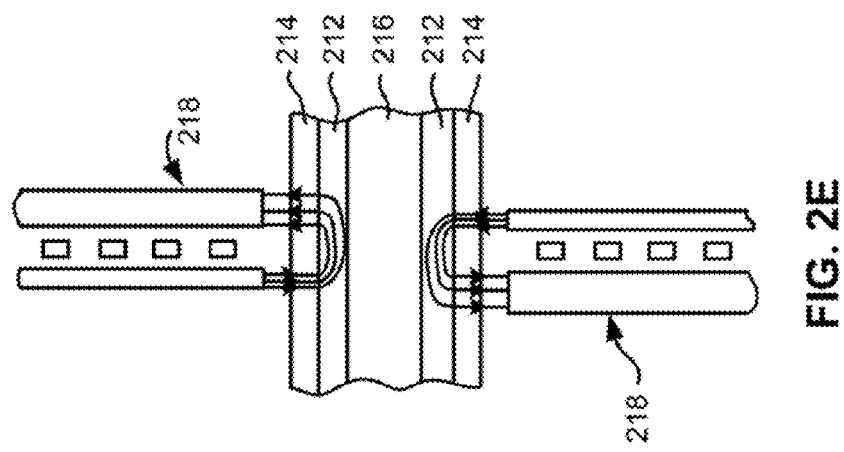
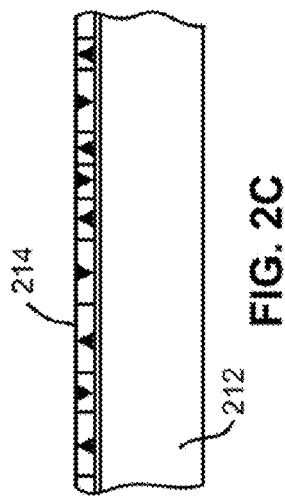
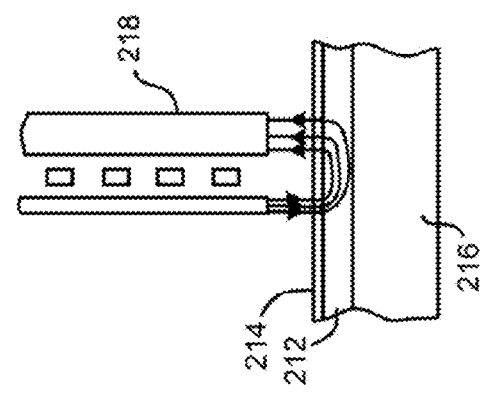
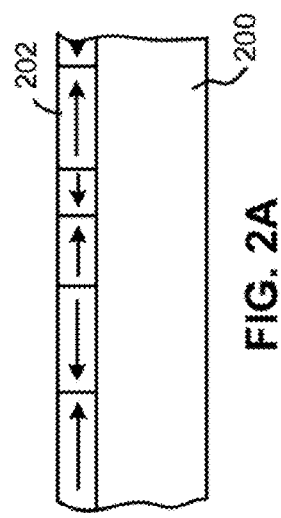
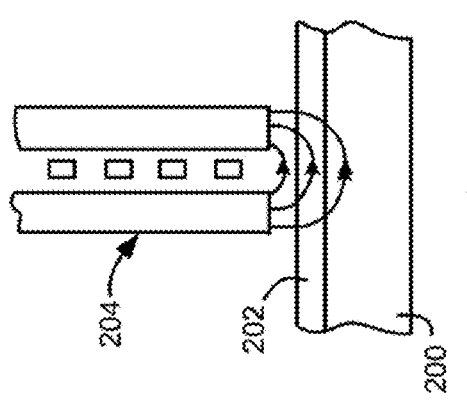

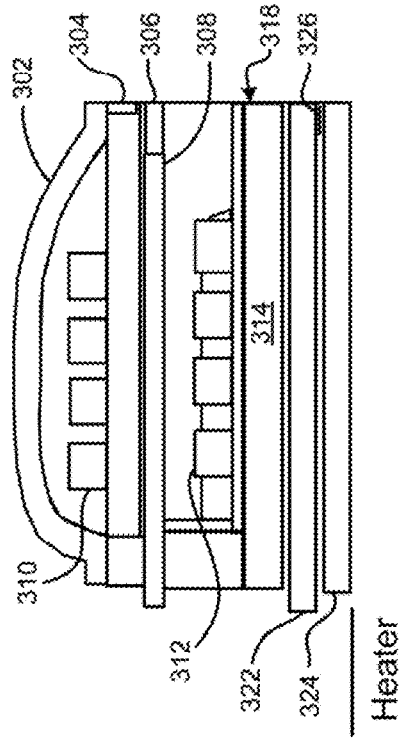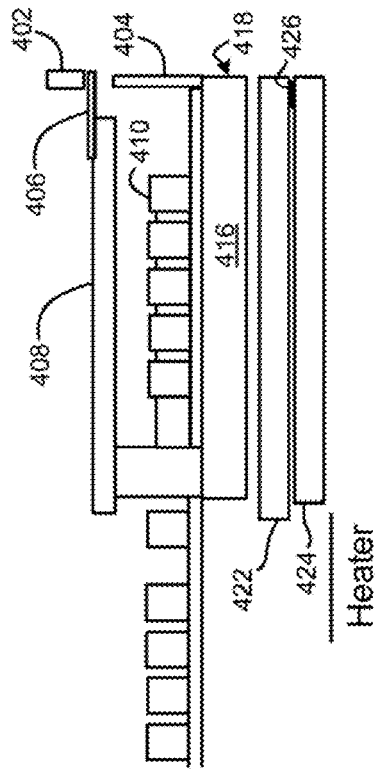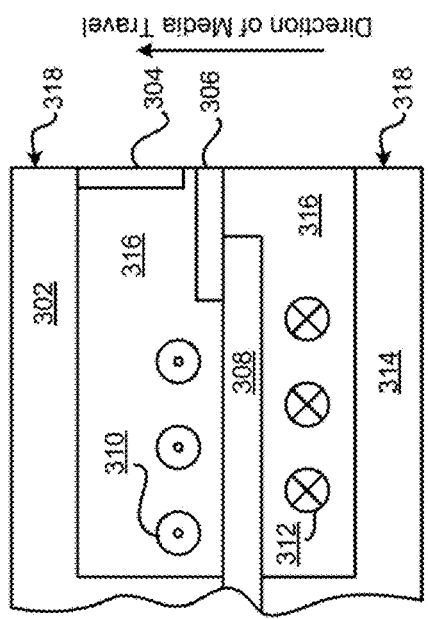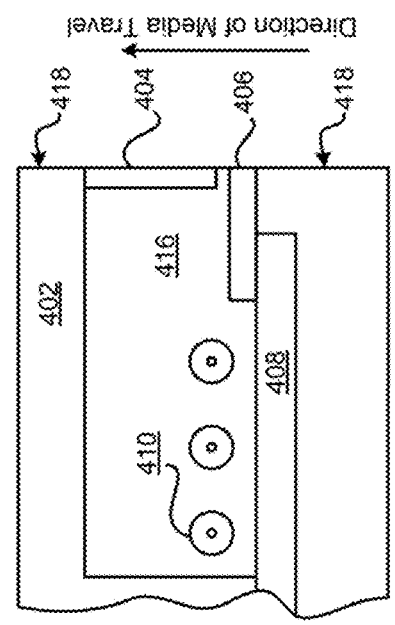

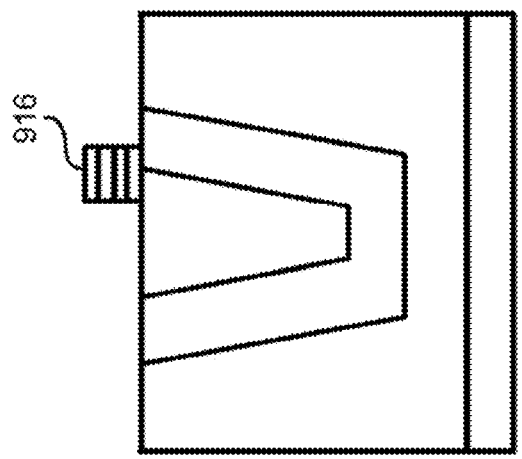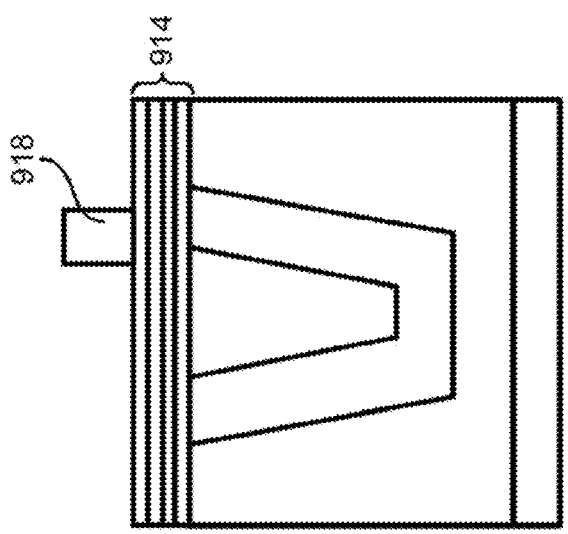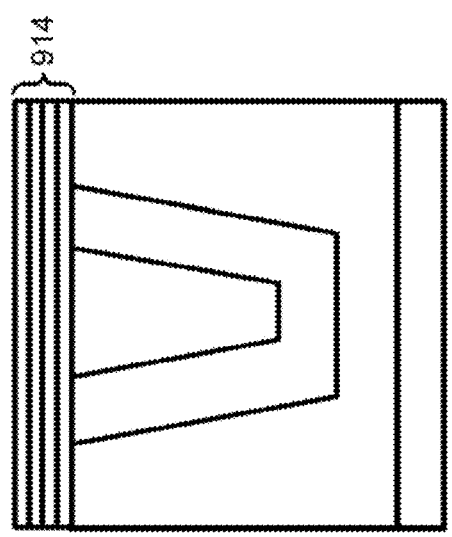

MICROWAVE ASSISTED MAGNETIC RECORDING (MAMR) HEAD HAVING AN OFFSET SPIN TORQUE OSCILLATOR (STO) AND NARROW TRAILING GAP

FIELD OF THE INVENTION

The present invention relates to data storage systems, and more particularly, this invention relates to a microwave assisted magnetic recording (MAMR) head structure having an offset spin torque oscillator (STO) and narrow trailing gap.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles, microwave assisted magnetic recording (MAMR) techniques and shingled magnetic recording (SMR) techniques have been proposed as techniques for obtaining high recording densities. In order to reduce the bit size and to maintain thermal stability of the medium as the density increases, a medium using a material having high magnetic anisotropy is more useful. However, when recording on this type of medium, recording becomes difficult because of the reduction in the magnetic field when using a recording head that has a corresponding size (i.e., it is miniaturized). In a MAMR system, an alternating current (AC) magnetic field to the medium to reverse the magnetization even when the magnetic field from the recording head is insufficient to achieve a bit flip.

In a SMR system, the manufacturing yield of the recording head may be improved because a writing head having a wide width is used because overwrites occur when the track widths are narrow.

In MAMR, an AC magnetic field is generated by a spin-torque oscillator (STO), but to obtain a large assistance effect, the STO must be sufficiently small so that a single magnetic domain is formed during oscillation. According to some conventional heads, the performance of SMR system may be improved by offsetting the STO from the end of the writing head when MAMR is used in the SMR system, and by using a STO having a narrower width than the recording head.

On the other hand, in a hard disk drive (HDD), when a skew angle is given to the head, a magnetic field distribution corresponding to the shape of the air bearing surface of the writing head is generated, but the equi-magnetic potential lines of the recording magnetic field leak from the track, and the recording magnetic field leaks become noise. Therefore, both sides of the head are used differently in response to the skew angle so that there is no leakage from the track, and the characteristics do not degrade. It is important to maintain high performance characteristics on both sides of the head.

In addition, in a MAMR head, the efficiency of the assisted recording is improved by placing the STOs in the trailing gaps of the recording head. However, because of the difficulty in fabricating the STOs from thinner films, some problems occur when attempting to produce such as head, including narrowing the trailing gap, improving the magnetic field gradient of the recording head, and improving the recording performance. In one conventional head, asymmetric trailing gap lengths and a projection of a part of the main pole in the recording head has been used.

SUMMARY

A magnetic data storage system according to one embodiment includes a magnetic head adapted to record data according to a shingled magnetic recording (SMR) process. The magnetic head includes a main pole adapted to produce a writing magnetic field, a trailing shield positioned above a trailing side of the main pole, wherein a trailing gap is defined between the trailing shield and the main pole, and a spin torque oscillator (STO) positioned above a trailing corner of the main pole at an STO-side of the main pole, wherein the trailing gap has a greater length in a film thickness direction near the STO-side of the main pole than near a side of the main pole opposite the STO-side. The system also includes a magnetic disk medium having an inner portion and an outer portion, the inner portion being closer to a center of the magnetic disk medium than the outer portion; a drive mechanism for passing the magnetic disk medium over the magnetic head; and a controller electrically coupled to the magnetic head for controlling operation of the magnetic head.

A method for forming a magnetic head according to one embodiment includes forming a first magnetic film above a substrate; forming a groove in the first magnetic film; forming a first gap layer in the groove, the first gap layer comprising an electrically insulating material; forming a second magnetic film in the groove above the first gap layer; planarizing the second magnetic film and the first gap layer above the first magnetic film to form a main pole, a leading gap, and side gaps; forming a spin torque oscillator (STO) above one side of the main pole (a STO-side of the main pole) and adjacent side gap; forming a second gap layer above the STO, the first magnetic film, the side gaps, and the main pole; forming a third magnetic film above the second gap layer; planarizing the third magnetic film and the second gap layer to a height of the STO to form a trailing gap, wherein the trailing gap has a greater length in a film thickness direction near the STO-side of the main pole than near a side of the main pole opposite the STO-side; and forming a trailing shield which includes the third magnetic film above the STO and the second gap layer.

A magnetic head according to one embodiment includes a main pole adapted to produce a writing magnetic field; a trailing shield positioned above a trailing side of the main pole, wherein a trailing gap is defined between the trailing shield and the main pole; a side shield positioned on at least one side of the main pole in a cross-track direction, wherein a side gap is defined between the side shield and the main pole;

and a spin torque oscillator (STO) positioned above a trailing corner of the main pole at an STO-side of the main pole and above the side gap, wherein the trailing gap has a greater length in a film thickness direction near the STO-side of the main pole than near a side of the main pole opposite the STO-side.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIGS. 9A-9K show a method for forming a magnetic head, according to one embodiment.

DETAILED DESCRIPTION

Figure 1:
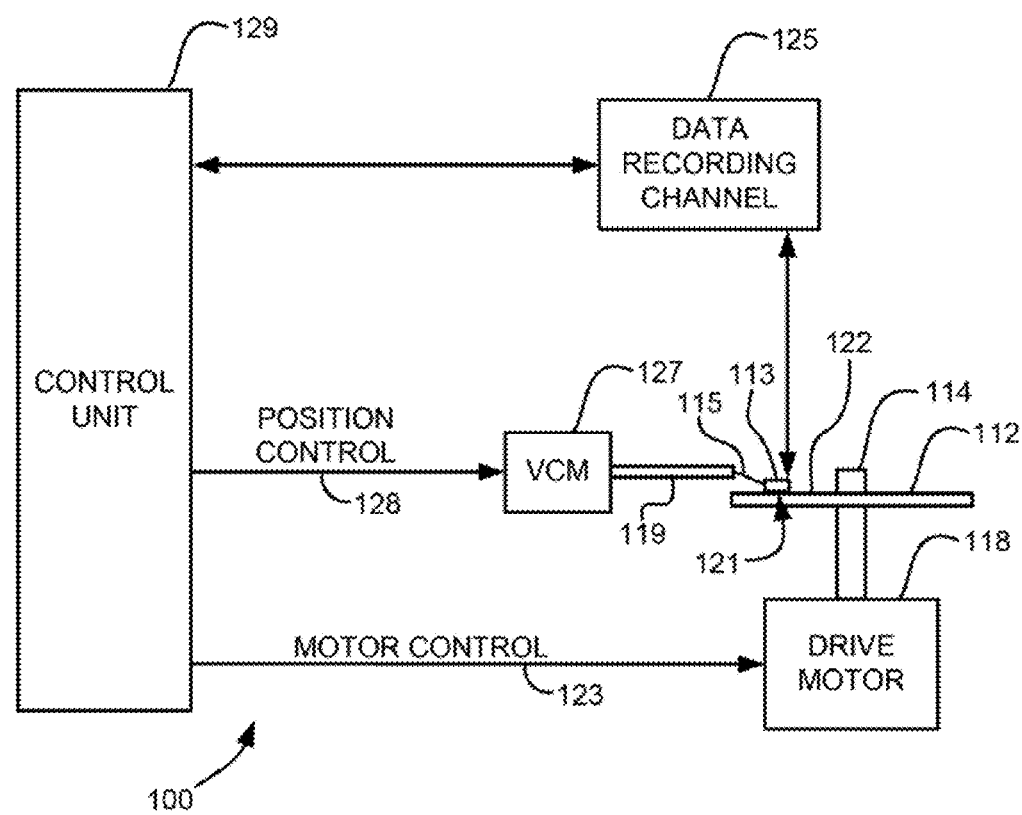
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic data storage system includes a magnetic head adapted to record data according to a shingled magnetic recording (SMR) process. The magnetic head includes a main pole adapted to produce a writing magnetic field, a trailing shield positioned above a trailing side of the main pole, wherein a trailing gap is defined between the trailing shield and the main pole, and a spin torque oscillator (STO) positioned above a first trailing corner of the main pole at an STO-side of the main pole, wherein the trailing gap has a greater length in a film thickness direction near the STO-side of the main pole and a lesser length in the film thickness direction near a second trailing corner of the main pole opposite the first trailing corner in a track width direction of the main pole. The system also includes a magnetic disk medium having an inner portion and an outer portion, the inner portion being closer to a center of the magnetic disk medium than the outer portion; a drive mechanism for passing the magnetic disk medium over the magnetic head; and a controller electrically coupled to the magnetic head for controlling operation of the magnetic head.

In another general embodiment, a method for forming a magnetic head includes forming a first magnetic film above a substrate; forming a groove in the first magnetic film; forming a first gap layer in the groove, the first gap layer comprising an electrically insulating material; forming a second magnetic film in the groove above the first gap layer; planarizing the second magnetic film and the first gap layer above the first magnetic film to form a main pole, a leading gap, and side gaps; forming a spin torque oscillator (STO) above one side of the main pole (a STO-side of the main pole) and adjacent side gap near a first trailing corner of the main pole; forming a second gap layer above the STO, the first magnetic film, the side gaps, and the main pole; forming a third magnetic film above the second gap layer; planarizing the third magnetic film and the second gap layer to a height of the STO to form a trailing gap, wherein the trailing gap has a greater length in a film thickness direction near the STO-side of the main pole and a lesser length in the film thickness direction near a second trailing corner of the main pole opposite the first trailing corner in a track width direction of the main pole; and forming a trailing shield which includes the third magnetic film above the STO and the second gap layer.

In yet another general embodiment, a magnetic head includes a main pole adapted to produce a writing magnetic field; a trailing shield positioned above a trailing side of the main pole, wherein a trailing gap is defined between the trailing shield and the main pole; a side shield positioned on at least one side of the main pole in a cross-track direction, wherein a side gap is defined between the side shield and the main pole; and a spin torque oscillator (STO) positioned above a first trailing corner of the main pole at an STO-side of the main pole and above the side gap, wherein the trailing gap has a greater length in a film thickness direction near the STO-side of the main pole and a lesser length in the film thickness direction near a second trailing corner of the main pole opposite the first trailing corner in a track width direction of the main pole.

As described, the recording characteristics of conventional MAMR systems deteriorate when a skew angle is introduced during writing. However, systems and methods of MAMR, as described herein according to various embodiments, are capable of maintaining their excellent recording characteristics even when a skew angle is introduced because both sides of the writing head are used. In addition, continued use of the writing head is possible even when the STO degrades over time.

In addition to a structure that is capable of performing assisted recording on both sides of the head by having two or more STOs with each writing head, the structure also provides a magnetic field from the STOs that enters perpendicular to the film plane so that the assistance effect is not degraded. Also, a wide trailing gap length is used for MAMR recording.

Referring now to FIG. 1, there is shown a disk drive 100 in accordance with one embodiment of the present invention. As shown in FIG. 1, at least one rotatable magnetic disk 112 is supported on a spindle 114 and rotated by a drive mechanism, which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch, pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Figure 5A:
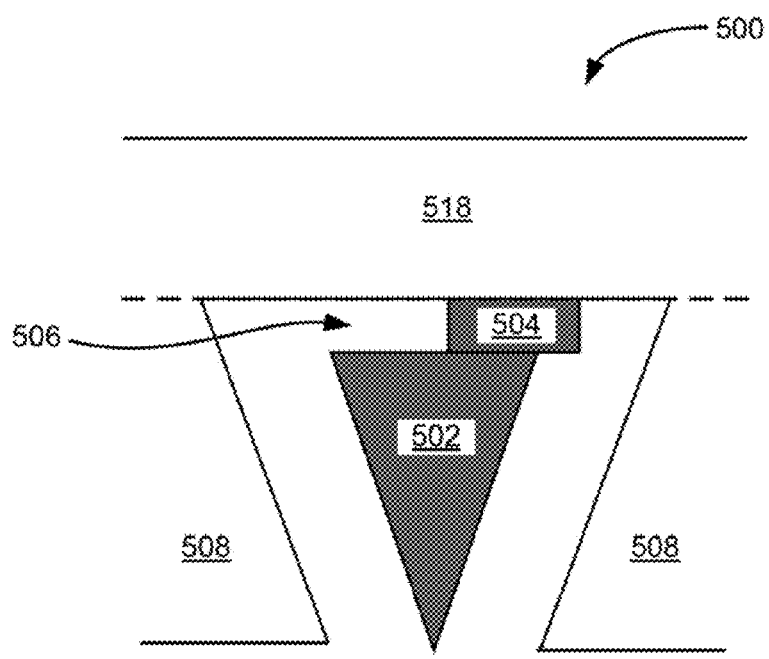
FIG. 5A shows a magnetic head according to the prior art.

With reference to FIG. 5A, a conventional magnetic head 500 structure is shown. The magnetic head 500 has a main pole 502 adapted for producing a writing magnetic field, a spin torque oscillator (STO) 504 adapted for producing an assistive magnetic field to aid in writing to a magnetic medium, one or more shields positioned in at least one direction from the main pole 502 at the ABS (the directions being up-track, down-track, and/or cross-track). For example, the head 500 may include a trailing shield gap 506 positioned on a trailing side of the main pole 502, one or more side shields 508 positioned in a cross-track direction of the main pole 502 at the ABS, a leading shield, etc. The head 500 also includes a uniform trailing gap 506 (e.g., a thickness of the trailing gap 506 is the same across the width of the trailing gap 506 in the cross-track direction) in which the STO 504 is positioned on a trailing side of the main pole 502 between the main pole 502 and the trailing shield 518. The STO 504 is positioned near a trailing corner of the main pole 502 in order to aid writing at this portion of the main pole 502.

Figure 5B:
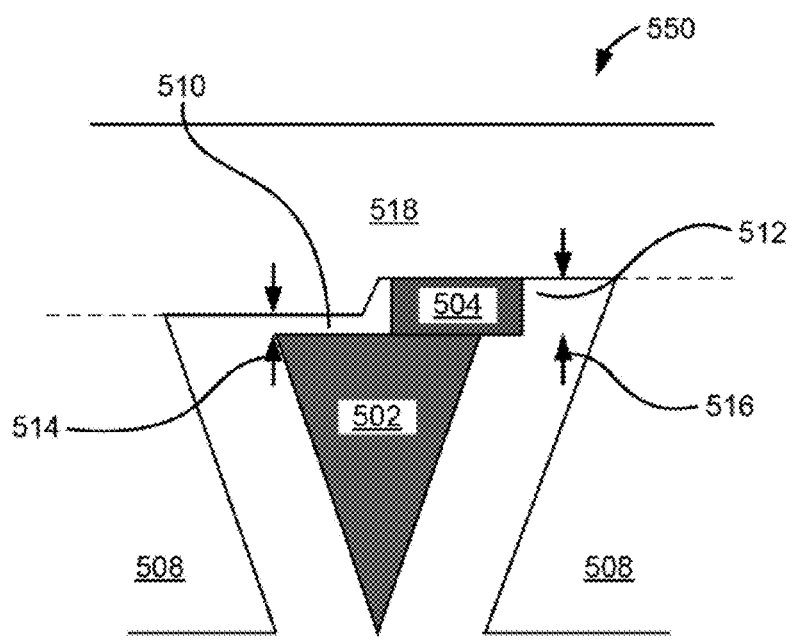
FIG. 5B shows a magnetic head according to one embodiment.

Referring now to FIG. 5B, a magnetic head 550 structure is shown according to one embodiment. The magnetic head 550 has asymmetric trailing gaps 510, 512 in which a length 514 of a first trailing gap 510 is less than a length 516 of a second trailing gap 512. Furthermore, the STO 504 is positioned on a side of the main pole 502 at a point where the trailing gap is wider, i.e., at the second trailing gap 512. All other structures and elements described in FIG. 5A apply in the description of FIG. 5B.

In the magnetic head 550 structure as shown in FIG. 5B, excellent characteristics are obtained on both sides of the head even if there is one STO element used for the assistive magnetic field. For example, because the outer peripheral side of a HDD employing such a magnetic head has a high transmission speed, recording becomes difficult and compensation is possible by using MAMR. FIG. 5B shows a structure where the outer peripheral side of a disk-based medium is recorded using the STO-side of the main pole 502 (the portion of the main pole 502 closest to the second trailing gap 512) for assisting the recording, while the inner peripheral of the disk-based medium is recorded using the narrow trailing gap side of the main pole 502 (the portion of the main pole 502 closest to the first trailing gap 510).

Figure 6A:
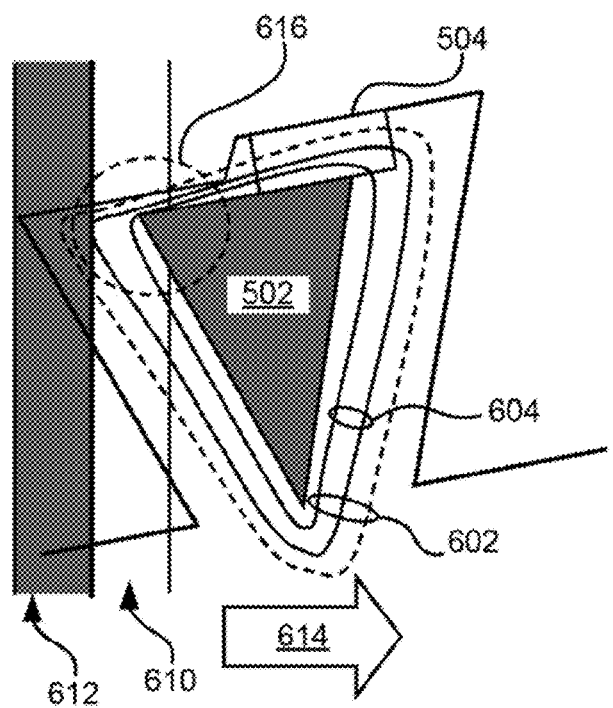
FIG. 6A shows a magnetic head being used to write at a skew angle, according to the prior art.
Figure 6B:
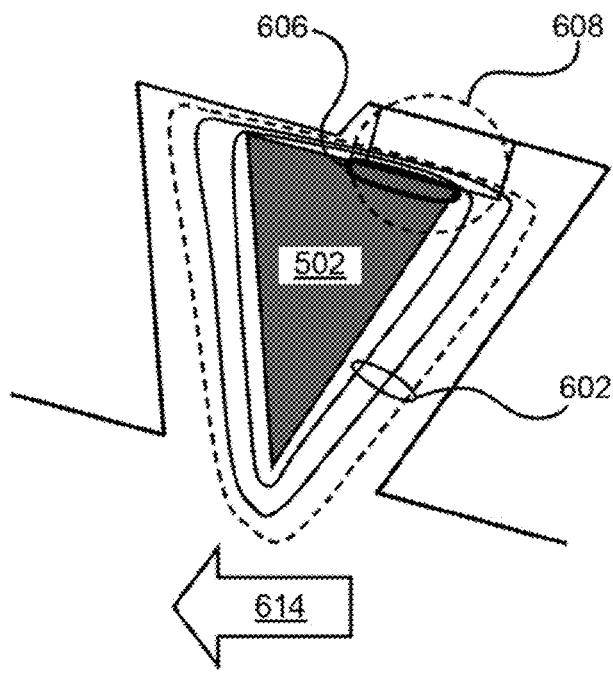
FIG. 6B shows a magnetic head being used to write at a skew angle, according to one embodiment.

FIG. 6A is a diagram of the magnetic head projected on the disk-based medium when there is a skew angle introduced during recording. The equi-magnetic potential lines of the recording head are indicated approximately by lines 602, with solid lines 604 indicating the equi-magnetic potential lines of the magnetic field having reversed magnetization of the medium. The magnetic field increases when moving toward the inside of the main pole 502. When the STO 504 is off (deactivated such that no current is provided to the STO 504), both the magnitude and the gradient of the magnetic field become smaller on the STO-side of the main pole 502. Also, the magnetic field gradient on the narrow trailing gap side of the main pole 502 become larger. In FIG. 6B, when the STO 504 is on (activated such that current is provided to the STO 504), a higher magnetic field and magnetic field gradient are obtained on the STO-side of the main pole 502 (the portion 606 outlined on the main pole 502 below the STO 504 is an area having the strongest magnetic field) than on the narrow trailing gap side of the main pole 502. In addition, the equi-magnetic potential line 604 on the outside is the region that is not in the reversed magnetic field of the medium. The recording bit state of the medium is determined by the shape on the outermost side of the solid lines 604, with the data track being recorded according to SMR being indicated by FIG. 6A.

When these equi-magnetic potential lines 602 are forced into an adjacent track, indicated by shape 612, the recording bits in the adjacent track 612 are erased, and the signal-to-noise ratio (SNR) of the adjacent track 612 decreases. Therefore, the side of the main pole 502 used to record data is the one in which the solid lines 604 of the equi-magnetic potential lines 602 of the recording magnetic field on the inner periphery and the outer periphery are not forced into the adjacent track 612. Specifically, on the inner peripheral and outer peripheral sides, the characteristics in the track width direction may be improved by recording in the recording head region indicated by 606 and shingled recording in the direction indicated by 614.

Figure 7A:
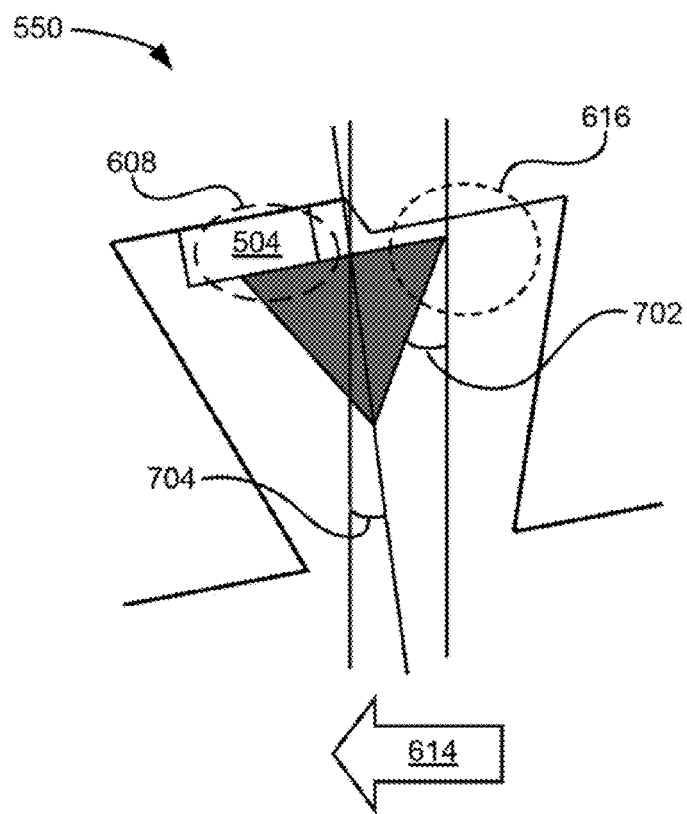
FIG. 7A shows a magnetic head being used to write at a skew angle, according to one embodiment.
Figure 7B:
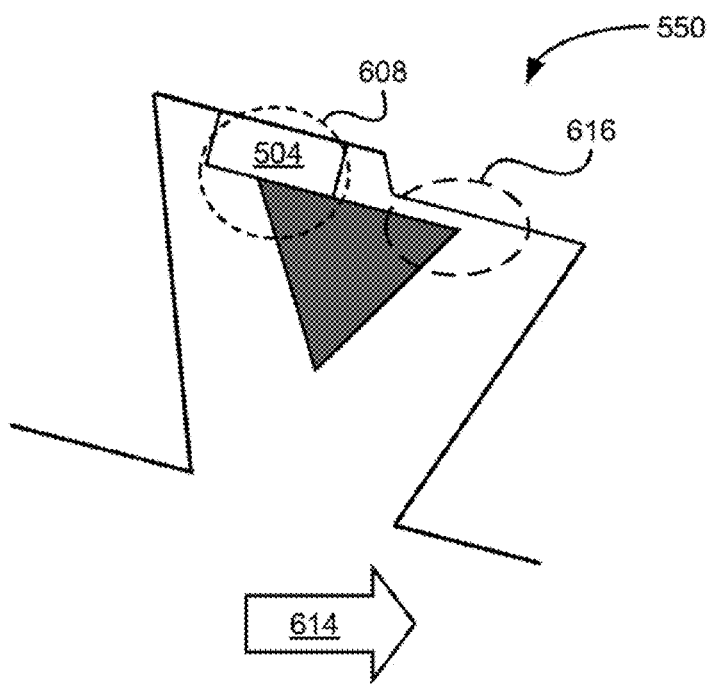
FIG. 7B shows a magnetic head being used to write at a skew angle, according to one embodiment.

According to another embodiment, with reference to FIG. 7A, when a bevel angle 702 of the magnetic head 550 is sufficiently larger than the skew angle 704, and recording is performed using the STO-side 616 of the main pole 502, sometimes, the head magnetic field produced in the vicinity of the SMR track is insufficient to act as a writing magnetic field (e.g., it is not strong enough to flip the bits in the magnetic medium). In this case, the STO 504 may be positioned on the opposite side of the main pole 502 than that described in FIGS. 6A-6B to perform recording, as shown in FIGS. 7A-7B, where recording is performed using the side 616 of the mail pole 502 opposite the STO-side 608 of the main pole 502 in FIG. 7A, and the side 616 of the main pole 502 in the STO-side 608 of the main pole 502 in FIG. 7B.

In addition, if the HDD mechanism is designed to enable switching from recording using both sides of the magnetic head 550 to recording using only one side of the magnetic head 550, when defects arise in the STO 504 caused by degradation over time, the HDD may stop using the STO 504, and it is possible to switch operation of the HDD to perform recording using only the narrow trailing gap side of the main pole 502. Furthermore, after the HDD is assembled, the characteristics on the STO-side of the main pole 502 may be compared to those on the side of the main pole 502 which does not have the STO 504. In this case, if one side of the main pole 502 does not have good recording characteristics, then the side of the main pole 502 having the better recording characteristics may be selected as the side to use during SMR, and shingled recording using only one side of the main pole 502 may be used.

In accordance with one embodiment, a magnetic data storage system (such as that shown in FIG. 1) may comprise a magnetic head adapted to record data according to a SMR process, a magnetic disk medium, a drive mechanism for passing the magnetic disk medium over the magnetic head, and a controller electrically coupled to the magnetic head for controlling operation of the magnetic head. The magnetic disk medium comprises an inner portion and an outer portion, with the inner portion being closer to a center of the magnetic disk medium than an outer portion of the magnetic disk medium.

The magnetic head may be configured similar to any shown in FIGS. 5B, 6A-6B, and/or 7A-7B. For example, the magnetic head 550 may be adapted to record data according to a SMR process and may comprise a main pole 502 adapted to produce a writing magnetic field; a trailing shield 518 positioned on a trailing side of the main pole, wherein a trailing gap is defined between the trailing shield and the main pole; and a STO 504 positioned above a trailing corner of the main pole at an STO-side of the main pole. The trailing gap has a greater length in a film thickness direction near the STO-side of the main pole (trailing gap height 516) than near a side of the main pole opposite the STO-side (trailing gap height 514).

A bevel angle of the main pole may affect recording characteristics of the main pole. The bevel angle may be equal to, greater than, or less than a skew angle of the magnetic head (such as shown in FIGS. 6A-6B) at different skew angles as the head is moved across the magnetic disk medium. The skew angle is measured between: a) a line transecting a center of the main pole in a cross-track direction, and b) a line parallel to a track direction of the track of the magnetic disk medium having data recorded thereto, while the bevel angle is measured between: a) a side of the main pole closest to the track of the magnetic disk medium having data recorded thereto, and b) the line parallel to the track direction of the track of the magnetic disk medium having data recorded thereto.

Furthermore, depending on the skew angle, bevel angle, and recording characteristics of the magnetic head, it may be preferable to orient the main pole such that the STO-side of the main pole is farther from the center of the magnetic disk medium than the side opposite to the STO-side of the main pole, in various approaches.

Furthermore, as shown in FIG. 6A according to one approach, the controller may comprise logic adapted to record data, with the STO 504 off, to shingled tracks (610, 612) on the inner portion of the magnetic disk medium with a direction of shingling 614 oriented outward from the center of the magnetic disk medium.

In another approach, as shown in FIG. 6B, the controller may comprise logic adapted to record data, with the STO 504 on, to shingled tracks on the outer portion of the magnetic disk medium with a direction of shingling 614 oriented towards the center of the magnetic disk medium.

These approaches may be used as a default, when the STO is operating properly, and/or when the bevel angle of the main pole is insufficiently greater than the skew angle, as would be understood by one of skill in the art.

In another embodiment, depending on the skew angle, bevel angle, and recording characteristics of the magnetic head, it may be preferable to orient the main pole such that the STO-side of the main pole is closer to the center of the magnetic disk medium than the side opposite to the STO-side of the main pole, in various approaches.

Furthermore, the controller may comprise logic adapted to record data, with the STO on, to shingled tracks on the outer portion of the magnetic disk medium with a direction of shingling oriented outward from the center of the magnetic disk medium.

In another approach, the controller may comprise logic adapted to record data, with the STO off, to shingled tracks on the inner portion of the magnetic disk medium with a direction of shingling oriented towards the center of the magnetic disk medium.

The magnetic head, in accordance with several embodiments, may further comprise: a leading shield positioned on a leading side of the main pole, wherein a leading gap is defined between the leading shield and the main pole; and/or a side shield positioned on at least one side of the main pole in a cross-track direction, wherein a side gap is defined between the side shield and the main pole. Any gap described herein may include an electrically insulating material, such as dielectric, alumina, MgO, etc.

The controller may also comprise, in accordance with one embodiment, logic adapted to determine which portion of the main pole has better recording characteristics, the portion chosen from: a) a portion of the main pole near a trailing side thereof closest to the STO-side of the main pole with the STO on, or b) a portion, of the main pole near the trailing side thereof closest to the opposite side of the main pole with the STO off.

Figure 8:
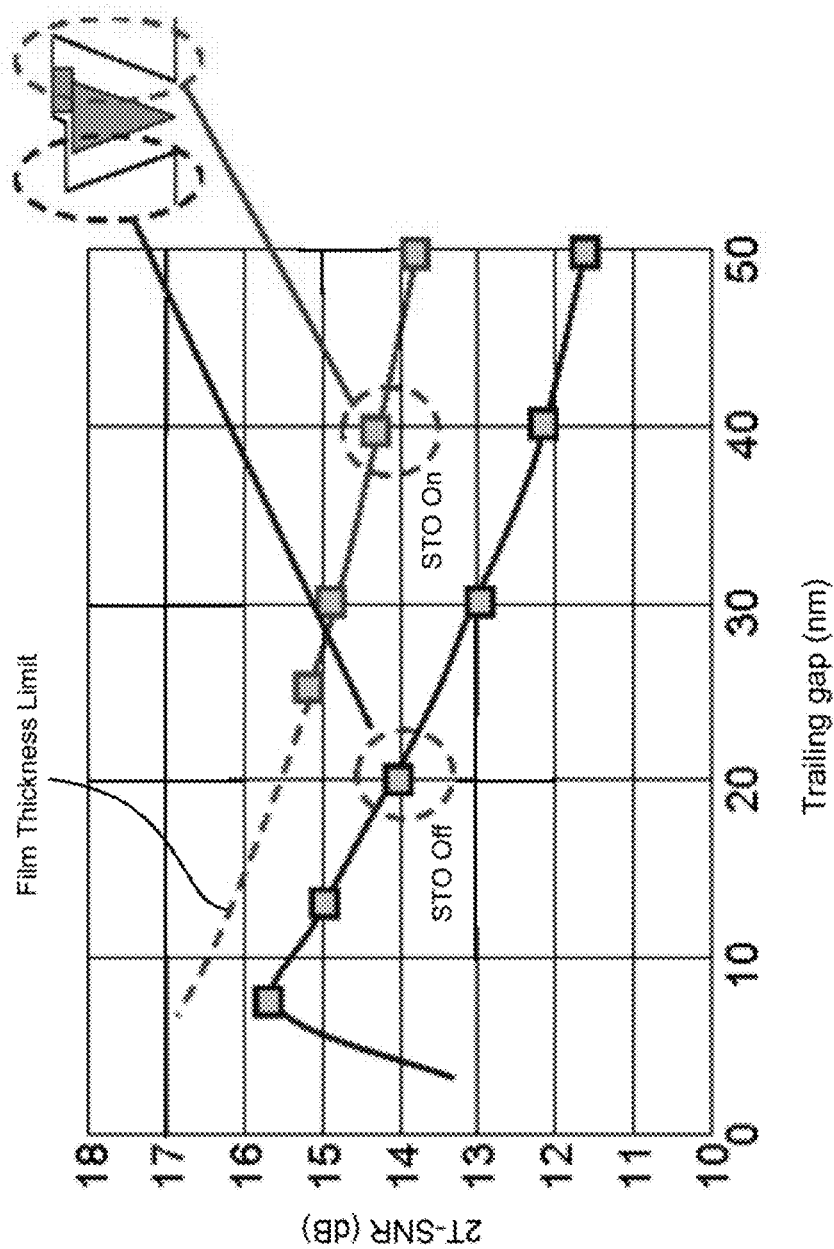
FIG. 8 shows a plot of a trailing gap length versus a signal-to-noise ratio, according to one embodiment.

FIG. 8 shows an example of a magnetic head where a drive current of the STO is on and when the drive current is off for a reference SNR (denoted as 2T-SNR) with respect to the trailing gap length. When the STO is on and assisted recording is performed, the STO may be designed so that the SNR obtained is nearly equivalent to that when the trailing gap length, is sufficiently narrow, even with the STO being off.

Figure 9A:
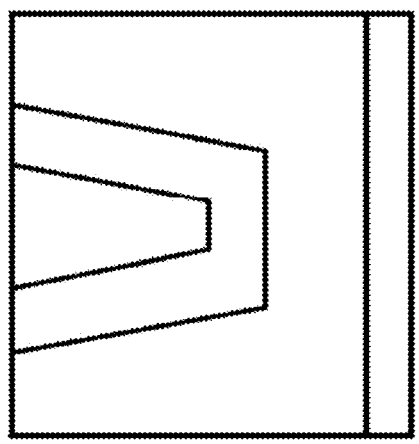

Next, a process for fabricating a magnetic head is described according to one embodiment. As shown in FIG. 9A, after a first magnetic film 904 comprising any suitable material, such as CoFe, NiFe, etc., is formed, such as via plating, on a suitable substrate 902, such as an inorganic insulating substrate, a resist 906 is formed above an upper surface of the first magnetic film 904, and one or more grooves 908 are formed therein via any suitable process, such as ion milling, reactive ion etching (RIE), etc. The first magnetic film 904 subsequently forms the leading shield and/or side shields in the completed structure.

Figure 9B:
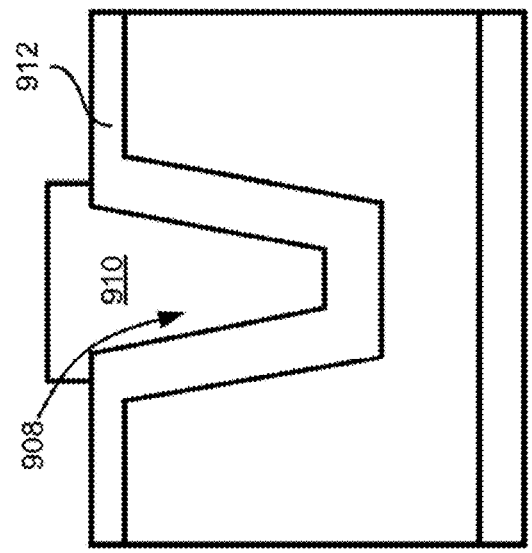
Figure 9C:
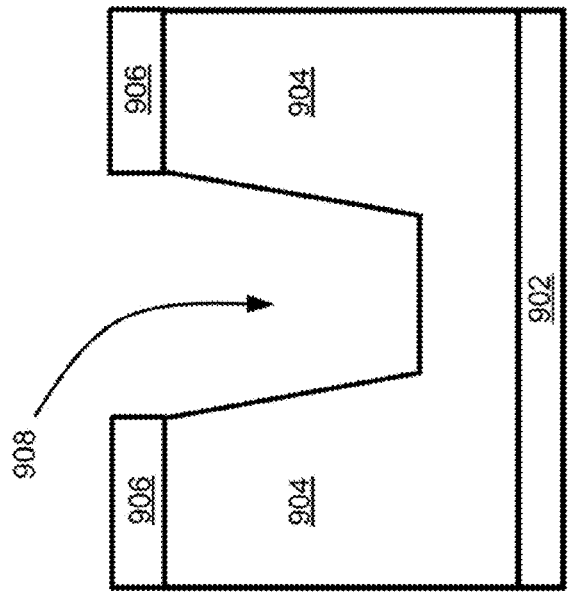

Next, as shown in FIG. 9B, after a gap layer 912 comprising a suitable material, such as a dielectric, $Al_2O_3$, MgO, etc., is formed above the structure, such as via vapor deposition, sputtering, etc., a second magnetic film 910 comprising any suitable material, such as CoFe, NiFe, etc., is formed in the groove 908, such as via plating, to form a main pole. Then, the second magnetic film 910 (main pole) and gap layer 912 are planarized, such as via chemical mechanical polishing (CMP), or any other suitable process known in the art to form the structure shown in FIG. 9C.

Then, as shown in FIG. 9D, for example, a multilayer film 914 is formed above the structure which will constitute the STO, by laminating a ground layer, a spin injection layer above the ground layer, a microwave field generation layer (FGL) above the spin injection layer, an assistance layer above the FGL, and a cap layer above the assistance layer. Of course, any other method of forming an STO may be used as known in the art.

Figure 9I:
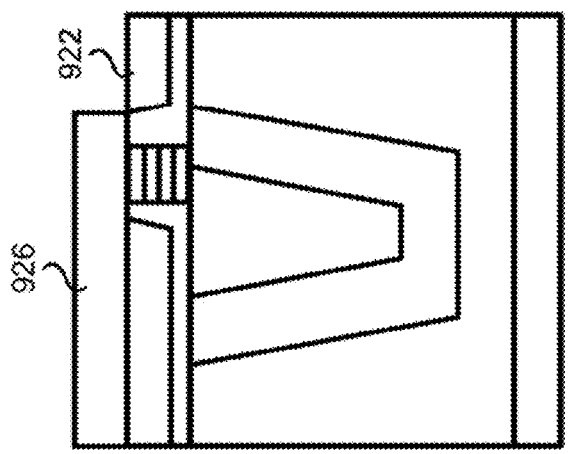
Figure 9H:
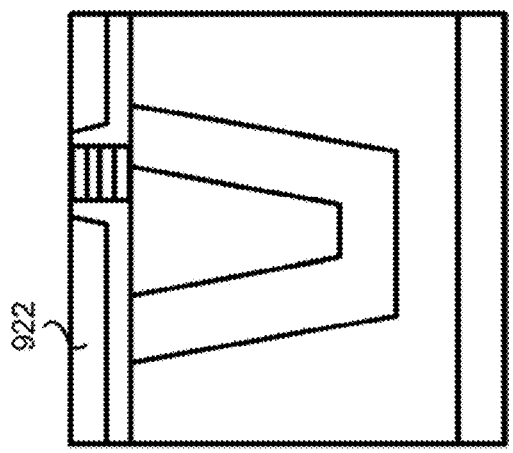
Figure 9G:
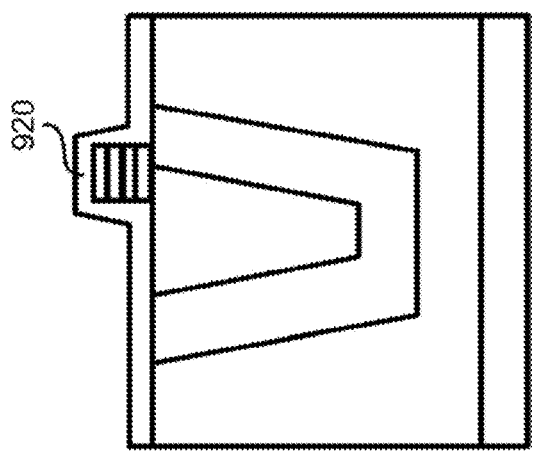
Figure 9K:
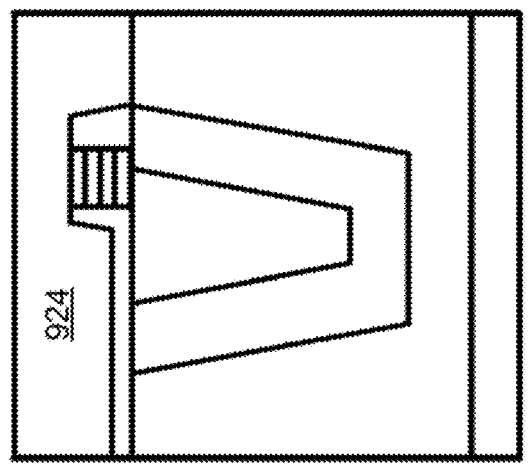
Figure 9J:
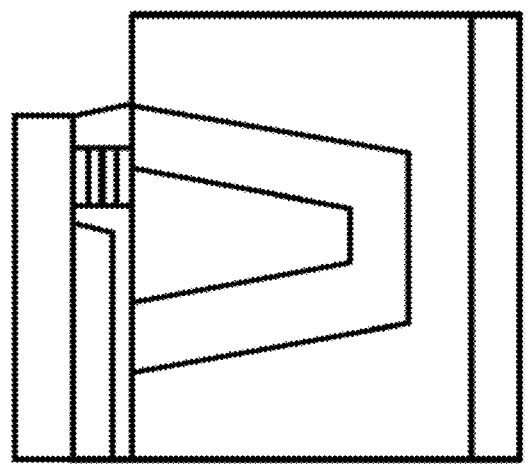

As shown in FIG. 9E, a resist 918 is formed above the multilayer film 914, and the STO 916 is formed, such as via etching, as shown in FIG. 9F. Then, as shown in FIG. 9G, a trailing gap layer 920, comprising any suitable insulating material, such as dielectric, $Al_2O_3$, MgO, etc., is formed, such as via vapor deposition, sputtering, etc., to form the trailing gap 920, and a third magnetic film 922 is formed thereabove, the third magnetic film 922 comprising any suitable material, such as CoFe, NiFe, etc., which forms the trailing shield in a subsequent step, is formed, such as via plating, and planarized as shown in FIG. 9H. Then, as shown in FIGS. 9I-9J, a resist 926 is formed, the third magnetic film 922 further to the outside on the STO-side of the main pole is removed by etching once, and as shown in FIG. 9K, a remaining portion of the trailing shield is formed, thereby forming the entire trailing shield 924.

In accordance with FIGS. 9A-9K, a method for forming a magnetic head may comprise forming a first magnetic film above a substrate; forming a groove in the first magnetic film; forming a first gap layer in the groove, the first gap layer comprising an insulating material; forming a second magnetic film in the groove above the first gap layer; planarizing the second magnetic film and the first gap layer above the first magnetic film to form a main pole, a leading gap, and side gaps; forming a STO above one side of the main pole (a STO-side of the main pole) and adjacent side gap; forming a second gap layer above the STO, the first magnetic film, the side gaps, and the main pole; forming a third magnetic film above the second gap layer; planarizing the third magnetic film and the second gap layer to a height of the STO to form a trailing gap, such that the trailing gap has a greater length in a film thickness direction near the STO-side of the main pole than near a side of the main pole opposite the STO-side; and forming a trailing shield which includes the third magnetic film above the STO and the trailing gap.

In a further embodiment, forming the trailing shield which includes the third magnetic film may comprise forming a resist above portions of the third magnetic film and the second gap layer, wherein a portion of the third magnetic film is exposed at positions beyond an exposed portion of the second gap layer adjacent the STO in a cross-track direction; etching the exposed portion of the third magnetic film and the second gap layer therebeneath near the STO-side of the main pole; removing the resist; and forming a fourth magnetic film above the third magnetic film, the STO, and the second gap layer to form a remaining portion of the trailing shield, which when combined with the third magnetic film comprises the trailing shield.

In another further embodiment, forming the STO may comprise forming a multilayer film above the first magnetic film, the side gaps, and the main pole, the multilayer film comprising: a ground layer, a spin injection layer, a microwave FGL, an assistance layer, and a cap layer; forming a resist on a portion of the multilayer film above the STO-side of the main pole and adjacent side gap; etching the multilayer film not located under the resist to form the STO; and removing the resist.

Figure 10:
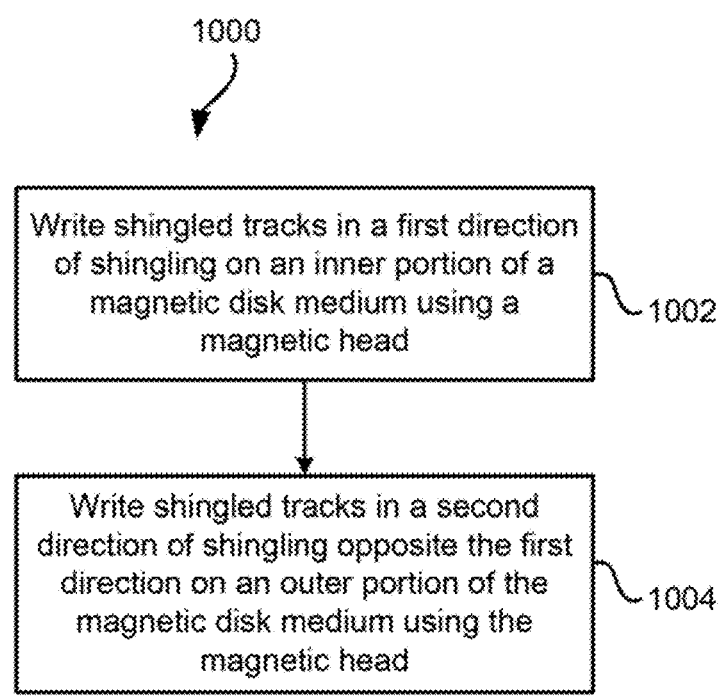
FIG. 10 shows a flowchart of a method, according to one embodiment.

In another embodiment, as shown in FIG. 10, a method 100 for writing shingled data tracks using a magnetic head may include the following operations.

In operation 1002, shingled tracks are written in a first direction of shingling on an inner portion of a magnetic disk medium using the magnetic head.

In operation 1004, shingled tracks are written in a second direction of shingling opposite the first direction on an outer portion, of the magnetic disk medium using the magnetic head.

Any magnetic head described herein according to various embodiments may be used to write the shingled tracks, such as magnetic head 550 shown in any of FIGS. 6A-7B.

in one approach, the STO-side of the main pole may be farther from a center of the magnetic disk medium than the side of the main pole opposite the STO-side, and in which case, when data is recorded on the inner portion, of the magnetic disk medium, the STO is off and the first direction of shingling is oriented outward from the center of the magnetic disk medium. Otherwise, when data is recorded on the outer portion of the magnetic medium, the STO is on and the second direction of shingling is oriented towards the center of the magnetic medium.

In another approach, the STO-side of the main pole may be closer to a center of the magnetic disk medium than the side of the main pole opposite the STO-side, and in which case, when data is recorded on the outer portion of the magnetic disk medium, the STO is on and the first direction of shingling is oriented outward from the center of the magnetic disk medium. Otherwise, when data is recorded on the inner portion of the magnetic medium, the STO is off and the second direction of shingling is oriented towards the center of the magnetic medium.

It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic data storage system, comprising:
   a magnetic head adapted to record data according to a shingled magnetic recording (SMR) process, the magnetic head comprising:
   a main pole adapted to produce a writing magnetic field;

a trailing shield positioned above a trailing side of the main pole,
wherein a trailing gap is defined between the trailing shield and the main pole; and
a spin torque oscillator (STO) positioned above a first trailing corner of the main pole at an STO-side of the main pole,
wherein the trailing gap has a greater length in a film thickness direction near the STO-side of the main pole and a lesser length in the film thickness direction near a second trailing corner of the main pole opposite the first trailing corner in a track width direction of the main pole;
a magnetic disk medium having an inner portion and an outer portion, the inner portion being closer to a center of the magnetic disk medium than the outer portion;
a drive mechanism for passing the magnetic disk medium over the magnetic head; and
a controller electrically coupled to the magnetic head for controlling operation of the magnetic head, wherein the controller is configured to selectively position the main pole of the magnetic head to record data to shingled tracks of the magnetic disk medium using a portion of the main pole near the trailing side thereof closest to the STO-side of the main pole or a portion of the main pole near the trailing side thereof closest to a side opposite the STO-side of the main pole.

2. The magnetic data storage system as recited in claim 1, wherein the STO-side of the main pole is farther from the center of the magnetic disk medium than the side of the main pole opposite the STO-side.

3. The magnetic data storage system as recited in claim 2, wherein the controller comprises logic adapted to record data, with the STO off, to shingled tracks on the inner portion of the magnetic disk medium with a direction of shingling oriented outward from the center of the magnetic disk medium.

4. The magnetic data storage system as recited in claim 2, wherein the controller comprises logic adapted to record data, with the STO on, to shingled tracks on the outer portion of the magnetic disk medium with a direction of shingling oriented towards the center of the magnetic disk medium.

5. The magnetic data storage system as recited in claim 1, wherein the STO-side of the main pole is closer to the center of the magnetic disk medium than the side of the main pole opposite to the STO-side.

6. The magnetic data storage system as recited in claim 5, wherein the controller comprises logic adapted to record data, with the STO on, to shingled tracks on the outer portion of the magnetic disk medium with a direction of shingling oriented outward from the center of the magnetic disk medium.

7. The magnetic data storage system as recited in claim 5, wherein the controller comprises logic adapted to record data, with the STO off, to shingled tracks on the inner portion of the magnetic disk medium with a direction of shingling oriented towards the center of the magnetic disk medium.

8. The magnetic data storage system as recited in claim 1, wherein the controller comprises logic adapted to determine which portion of the main pole has better recording characteristics, the portion chosen from: a) the portion of the main pole near the trailing side thereof closest to the STO-side of the main pole with the STO on, or b) the portion of the main pole near the trailing side thereof closest to the side opposite the STO-side of the main pole with the STO off.

9. A method for forming a magnetic head, the method comprising:
forming a first magnetic film above a substrate;
forming a groove in the first magnetic film;
forming a first gap layer in the groove, the first gap layer comprising an electrically insulating material;
forming a second magnetic film in the groove above the first gap layer;
planarizing the second magnetic film and the first gap layer above the first magnetic film to form a main pole, a leading gap, and side gaps;
forming a spin torque oscillator (STO) above one side of the main pole (a STO-side of the main pole) and adjacent side gap near a first trailing corner of the main pole;
forming a second gap layer above the STO, the first magnetic film, the side gaps, and the main pole;
forming a third magnetic film above the second gap layer;
planarizing the third magnetic film and the second gap layer to a height of the STO to form a trailing gap, wherein the trailing gap has a greater length in a film thickness direction near the STO-side of the main pole and a lesser length in the film thickness direction near a second trailing corner of the main pole opposite the first trailing corner in a track width direction of the main pole; and
forming a trailing shield which includes the third magnetic film above the STO and the second gap layer.

10. The method as recited in claim 9, wherein the forming the trailing shield which includes the third magnetic film comprises:
forming a resist above portions of the third magnetic film and the second gap layer, wherein a portion of the third magnetic film is exposed at positions beyond an exposed portion of the second gap layer adjacent the STO in a cross-track direction;
etching the exposed portion of the third magnetic film and the second gap layer therebeneath near the STO-side of the main pole;
removing the resist; and
forming a fourth magnetic film above the third magnetic film, the STO, and the second gap layer to form a remaining portion of the trailing shield, which when combined with the third magnetic film comprises the trailing shield.

11. The method as recited in claim 9, wherein the forming the STO comprises:
forming a multilayer film above the first magnetic film, the side gaps, and the main pole, the multilayer film comprising:
a ground layer;
a spin injection layer;
a microwave field generation layer (FGL);
an assistance layer; and
a cap layer;
forming a resist on a portion of the multilayer film above the STO-side of the main pole and adjacent side gap;
etching the multilayer film not located under the resist to form the STO; and
removing the resist.

12. A magnetic head, comprising:
a main pole configured to produce a writing magnetic field when a write coil is energized;
a trailing shield positioned above a trailing side of the main pole, wherein a trailing gap is defined between the trailing shield and the main pole;
a side shield positioned on at least one side of the main pole in a cross-track direction, wherein a side gap is defined between the side shield and the main pole; and
a spin torque oscillator (STO) positioned above a first trailing corner of the main pole at an STO-side of the main pole and above the side gap, the STO being configured to selectively receive current independent of the write coil, and wherein the trailing gap has a greater length in a film thickness direction near the STO-side of the main pole and a lesser length in the film thickness direction near a second trailing corner of the main pole opposite the first trailing corner in a track width direction of the main pole.

13. A magnetic data storage system, comprising:
at least one magnetic head as recited in claim 12;
a magnetic medium;
a drive mechanism for passing the magnetic medium over the at least one magnetic head; and
a controller electrically coupled to the at least one magnetic head for controlling operation of the at least one magnetic head.

14. A method for writing shingled data tracks, the method comprising:
writing shingled tracks in a first direction of shingling on an inner portion of a magnetic disk medium using the magnetic head as recited in claim 12; and
writing shingled tracks in a second direction of shingling opposite the first direction on an outer portion of the magnetic disk medium using the magnetic head.

15. The method as recited in claim 14, wherein the STO-side of the main pole is farther from a center of the magnetic disk medium than the side of the main pole opposite the STO-side.

16. The method as recited in claim 15, wherein when data is recorded on the inner portion of the magnetic disk medium, the STO is off and the first direction of shingling is oriented outward from the center of the magnetic disk medium.

17. The method as recited in claim 15, wherein when data is recorded on the outer portion of the magnetic medium, the STO is on and the second direction of shingling is oriented towards the center of the magnetic medium.

18. The method as recited in claim 14, wherein the STO-side of the main pole is closer to a center of the magnetic disk medium than the side of the main pole opposite the STO-side.

19. The method as recited in claim 18, wherein when data is recorded on the outer portion of the magnetic disk medium, the STO is on and the first direction of shingling is oriented outward from the center of the magnetic disk medium.

20. The method as recited in claim 18, wherein when data is recorded on the inner portion of the magnetic medium, the STO is off and the second direction of shingling is oriented towards the center of the magnetic medium.

* * * * *

UNITED STATES PATENT AND TRADEMARK OFFICE
CERTIFICATE OF CORRECTION

| | | |
|---|---|---|
| PATENT NO. | : 8,705,206 B1 | Page 1 of 1 |
| APPLICATION NO. | : 13/725354 | |
| DATED | : April 22, 2014 | |
| INVENTOR(S) | : Maeda et al. | |

It is certified that error appears in the above-identified patent and that said Letters Patent is hereby corrected as shown below:

In the specification:

col. 9, line 16 replace "mail" with --main--.

Signed and Sealed this
Twenty-second Day of July, 2014

Michelle K. Lee
*Deputy Director of the United States Patent and Trademark Office*